Feb. 12, 1929.
W. J. HUGHES
1,701,719
WATER SOFTENING APPARATUS
Filed April 4, 1924
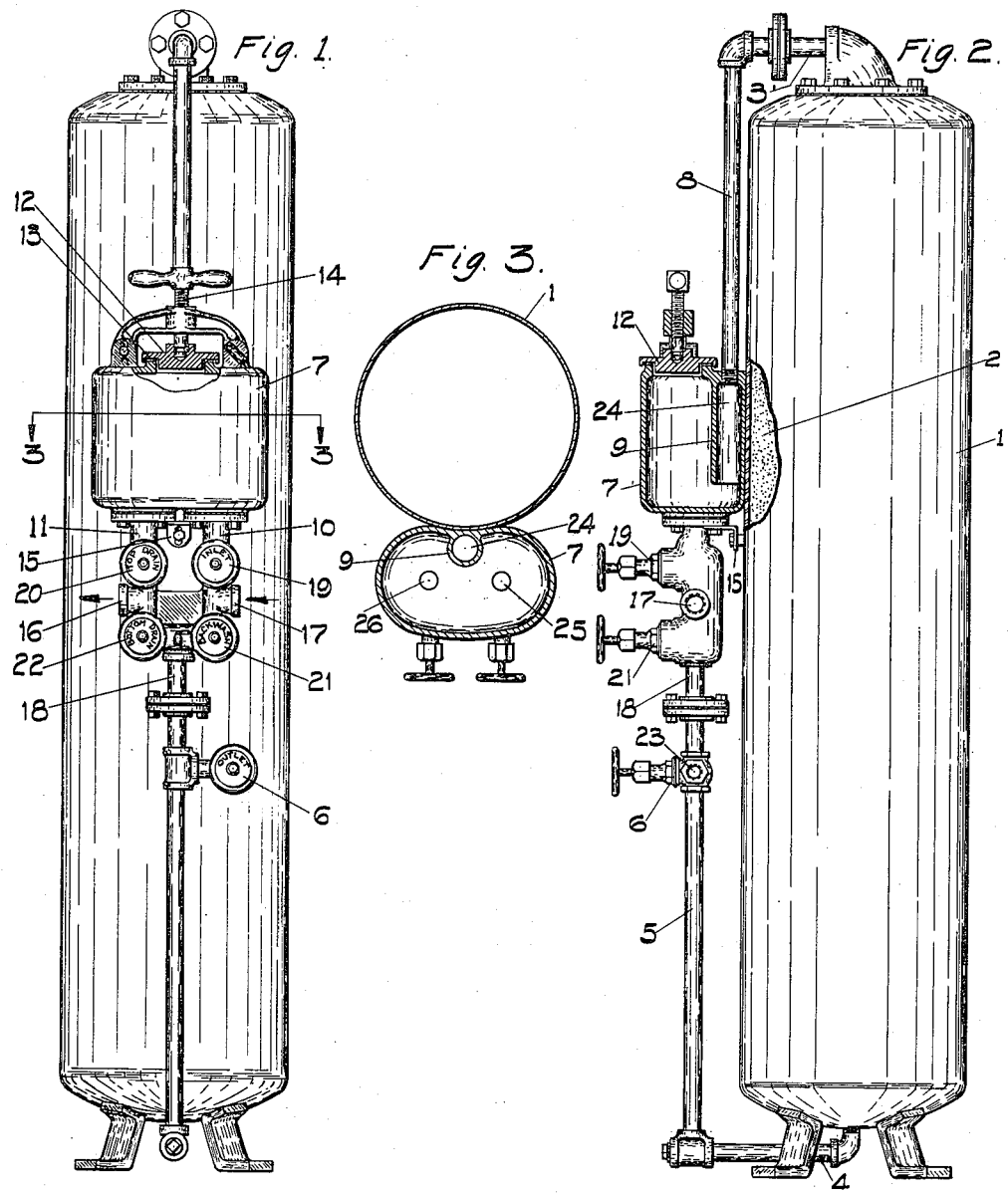
INVENTOR.
Walter J. Hughes
BY Walter A. Knight
ATTORNEY Patented Feb. 12, 1929.

1,701,719

UNITED STATES PATENT OFFICE.

WALTER J. HUGHES, OF FORT WAYNE, INDIANA, ASSIGNOR, BY MESNE ASSIGNMENTS TO THE PERMUTIT COMPANY, OF NEW YORK, N. Y., A CORPORATION OF DELAWARE.

WATER-SOFTENING APPARATUS.

Application filed April 4, 1924. Serial No. 704,105.

My invention relates to zeolite water softening apparatus of the filter type, in which type hard water is first passed through the zeolite bed to soften it, then the bed is back-washed, then brine is passed through the bed to regenerate the exhausted zeolites and then the zeolites are washed free of brine before being again used to soften water.

The distinctive feature of this apparatus is that the receptacle for the regenerating agent is so formed and placed as to constitute merely a liquid passage during the water softening and back-washing operations and yet is capable of functioning efficiently as a container for the regenerating agent during regeneration. Its use involves no additional valves, simply the five valves necessary for the operation of any water softening apparatus of the filter type.

The construction of the container for regenerating agent or salt feeder, as it is usually termed, permits of opening and draining same to receive the salt or other chemical without draining or admitting air to the softening apparatus.

The salt feeder is arranged at a convenient height for filling. The partition wall in the salt feeder serves two purposes, first; as a trap to prevent air getting into the softening apparatus, and second; to secure circulation of the incoming water through the salt or other chemical as needed to secure solution quickly without danger of carrying any of the solid salt or chemical over into the water softening apparatus.

The salt feeder may be made of such size as to hold the correct amount of salt or other chemical needed to regenerate the exhausted zeolite bed.

In the particular embodiment of my invention selected for illustration, my invention is shown applied to a downward or gravity flow zeolite water softening apparatus of the filter type.

Figure 1 is an elevation of the apparatus viewed from the salt feeder side;

Fig. 2 is a side elevation at a right angle to Fig. 1, the salt feeder and contiguous part of the tank being shown in vertical axial section; and Fig. 3 is a horizontal section of the line 3—3 of Fig. 1.

Referring now to the drawing, 1 is a tank containing bed of granular zeolites 2. Hard water to be softened is admitted at the top through the pipe 3 and the soft water is drained off from the bottom through the pipe 4, riser pipe 5 and valve 6 and outlet 23. During back-washing water flows into the tank 1 through the pipe 4 and out through pipe 3.

A salt feeder 7, preferably made of cast iron, has an open bottomed chamber 24 forming a continuation of the pipe 8 formed by the wall 9, which extends downwardly well toward the bottom of the contiguous main salt feeder chamber. Pipes 10, 11 connect with openings 25, 26 respectively in the bottom of the salt feeder 7.

A hinged cover 12 may be securely seated on the gasket 13 by screw 14. The salt feeder is supported on the adjustable bracket 15.

A nest of control valves with lateral waste outlet 16 and raw water inlet 17, upper passages 10, 11, and lower passage 18, consist of a so-called inlet valve 19, top drain valve 20, back-wash valve 21, bottom drain valve 22 and outlet valve 6. These are the only valves necessary to control the flow of liquids through the apparatus during the softening, back-washing, regenerating and washing out operations.

The operation of the apparatus is as follows: Assume that valves 20, 21 and 22 are closed and valves 6 and 19 are open and the water softening capacity of the zeolite bed has been substantially exhausted. The valves 6 and 19 are then closed, and the valve 21 is opened to admit raw water to the bottom of the tank for back-washing, and the valve 20 is opened to drain it off from the top after it has passed upwardly through the bed loosening and expanding it. Valve 21 is then closed while valve 20 is left open. The cover 12 of the salt feeder 7 is then loosened and raised. Lifting the cover 12 of the salt feeder 7 admits air thereto allowing it to drain through valve 21 after which valve 21 is closed. The salt feeder 7 is now filled with the required quantity of clean salt, and water which is let in by slightly opening inlet valve 19. When all of the air has been expelled from the salt feeder, valve 19 is closed and the cover 12 replaced and held in position by means of screw 14. The salt or other chemical is now flushed through the bed of exhausted zeolite in the water softening apparatus by opening valves 19 and 22. Either one of these valves 19 or 22 may be used to regulate the flow of the brine downwardly through the zeolite bed 2 at a speed which will regenerate it and pass the waste brine through the pipes 4, 5 and valve 22 through the waste outlet 16.

It will be seen that the raw water flows into the salt feeder 7 through the pipe 10 in such a course as to circulate through the salt to the top of the feeder 7, dissolving the salt, and the brine then passes downwardly under the wall 9. This circulation quickly secures a solution of brine which is passed upwardly through pipe 8 and into the top of the water softening apparatus.

When the salt has all dissolved and all the brine has passed out of the salt feeder 7 and through the zeolite bed 2 the raw fresh water is allowed to continue to run until the zeolite bed has been washed free of brine. Then the valve 22 is closed and the valve 6 opened, permitting the fresh softened water to again flow out through the passage 23 for use.

The simplicity of operation will be apparent.

Many changes may be made in the apparatus without departing from the spirit of my invention, as for instance, a four-way valve may replace valves 19, 20, 21 and 22, or a single five-way valve may replace all of these valves and valve 6.

I claim as my invention and desire to secure by Letters Patent of the United States:—

1. A water softening apparatus having in combination a softening tank, a bed of zeolites within said tank, a receptacle for salt, a tight closing cover for said receptacle, a pipe connection between said receptacle and the top of said tank, a valve nest manifold with raw water inlet and waste water outlet, a pipe connection between said manifold and the bottom of said tank, fluid connections between said manifold and said receptacle, a plurality of passages in said manifold to permit flows therethrough for backwashing, for brining, for rinsing, for passage of spent brine to waste, of back-wash water to waste, of rinse water to waste and of softened water to service and a valve controlling the flow through each of said passages.

2. A water softening apparatus having in combination a softening tank, a bed of zeolites within said tank, a receptacle for salt, a tight closing cover for said receptacle, a pipe connection between said receptacle and the top of said tank, a valve nest manifold with raw water inlet and waste water outlet, a pipe connection between said manifold and the bottom of said tank, fluid connections between said manifold and said receptacle, a valve controlled passage in said manifold from said inlet to said second named pipe connection to permit backwashing of said zeolite bed, a valve controlled passage in said manifold from said receptacle to said outlet, a valve controlled passage in said manifold from said inlet to said receptacle, a valve controlled passage in said manifold from said second named pipe to said outlet, and valves for all said passages.

In testimony whereof I have hereunto set my hand.

WALTER J. HUGHES.